US009444846B2

(12) United States Patent
Sharma et al.

(10) Patent No.: US 9,444,846 B2
(45) Date of Patent: Sep. 13, 2016

(54) METHODS AND APPARATUSES FOR TRUST COMPUTATION

(71) Applicant: Xerox Corporation, Norwalk, CT (US)

(72) Inventors: Avinash Sharma, Bangalore (IN); Partha Dutta, Bangalore (IN); Tridib Mukherjee, Bangalore (IN); Shruti Kunde, Mumbai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/308,748

(22) Filed: Jun. 19, 2014

(65) Prior Publication Data
US 2015/0373049 A1 Dec. 24, 2015

(51) Int. Cl.
*H04L 29/06* (2006.01)

(52) U.S. Cl.
CPC ..................... *H04L 63/20* (2013.01)

(58) Field of Classification Search
CPC .......................................................... H04L 63/20
See application file for complete search history.

(56) References Cited

U.S. PATENT DOCUMENTS

| 8,250,657 | B1* | 8/2012 | Nachenberg | G06F 21/51 |
| | | | | 705/50 |
| 8,726,344 | B1* | 5/2014 | Amidon | G06F 7/02 |
| | | | | 713/168 |
| 2006/0021018 | A1 | 1/2006 | Hinton et al. | |
| 2006/0259957 | A1 | 11/2006 | Tam et al. | |
| 2009/0151002 | A1* | 6/2009 | Zuniga | G06F 21/6209 |
| | | | | 726/27 |
| 2009/0248376 | A1* | 10/2009 | Silva | H04L 41/5009 |
| | | | | 703/2 |
| 2010/0106719 | A1* | 4/2010 | Donato | G06F 17/3071 |
| | | | | 707/728 |
| 2010/0106982 | A1* | 4/2010 | Castelli | G06F 1/3209 |
| | | | | 713/300 |
| 2010/0250628 | A1* | 9/2010 | Nanavati | G06F 21/31 |
| | | | | 707/812 |
| 2013/0291098 | A1* | 10/2013 | Chung | G06F 21/577 |
| | | | | 726/21 |
| 2014/0237570 | A1* | 8/2014 | Shishkov | G06F 21/316 |
| | | | | 726/7 |

FOREIGN PATENT DOCUMENTS

WO WO 2006/115919 A2 11/2006

OTHER PUBLICATIONS

[Storage 2007] A. L. Beberg and V. S. Pande. Storage@home: Petascale distributed storage. IPDPS 2007.

(Continued)

*Primary Examiner* — Eleni Shiferaw
*Assistant Examiner* — Alexander Lapian
(74) *Attorney, Agent, or Firm* — Jones Robb, PLLC

(57) ABSTRACT

Embodiments of a method are disclosed for computing trust index among multiple entities associated with a resource marketplace. The method includes receiving multiple inputs including interaction attributes, attribute importance factors, references to databases, and multiple entities associated with the resource marketplace. The method also includes creating a weighted-interaction graph based on the received inputs. The weighted-interaction graph includes multiple vertices representing the entities. The method further includes performing a topology-specific analysis of the weighted-interaction graph. The method furthermore includes computing Euclidean distances for each pair of vertices in the weighted-interaction graph based on the performed analysis. The method also includes determining a trust index for a first entity in the received multiple entities based on the computed Euclidean distances. The trust index includes ranking of at least one of the multiple entities with respect to the first entity. The ranking is inversely proportional to the computed Euclidean distances.

20 Claims, 9 Drawing Sheets

(56) References Cited

OTHER PUBLICATIONS

[Belkin2003] M. Belkin and P. Niyogi. Laplacian eigenmaps for dimensionality reduction and data representation. Neural computation, vol. 15, No. 6, pp. 1373-1396, 2003.
[Krzakala2013] Florent Krzakala, Cristopher Moore, Elchanan Mossel, Joe Neeman, Allan Sly, Lenka Zdeborová, Pan Zhang: Spectral redemption: clustering sparse networks. CoRR abs/1306.5550 (2013).
[Ng2001] A. Ng, M. Jordan and Y.Weiss. On spectral clustering: analysis and an algorithm. In Advances in Neural Information Processig Systems, pp. 849-856. MIT Press, 2001.
[JSMAP] Philipp Langhans, Christoph Wieser, and François Bry. 2013. Crowdsourcing MapReduce: JSMapReduce. In Proceedings of the 22nd international conference on World Wide Web companion (WWW '13 Companion).
[Qiu2007] H. Qiu and E. R. Hancock. Clustering and Embedding Using Commute Times. Pattern Analysis and Machine Intelligence, vol. 29, No. 11, pp. 1873-1890, 2007.
[Social 2010] Kyle Chard, Simon Caton, Omer Rana and Krish Bubendorfer. Social Cloud: Cloud Computing in Social Networks. IEEE Cloud Computing (Cloud 2010).
[Eigen 2003] Sepandar D. Kamvar, Mario T. Schlosser and Hector Gracia-Molina. The Eigen Trust Algorithm for Reputation Management in P2P Networks. 2003.
[CPUSAGE] http://www.cpusage.com/.
[BOINC] http://boinc.berkeley.edu/.
U.S. Appl. No. 14/077,584, filed Nov. 12, 2013; Cloud-Computing Infrastructure; Mukherjee et al.

* cited by examiner

| | |
|---|---|
| User-User | fuu(social,location,organization) |
| Owner-Owner | foo(social, location,organization) |
| Resource-Resource | frr(location, capability) |
| Owner-Resource | whether owns a resource; constant value |
| User-Resource | fur(usage_freq, avg_feedback) |
| User-Owner | whether same entity; constant value |

FIG. 6

METHODS AND APPARATUSES FOR TRUST COMPUTATION

TECHNICAL FIELD

Some of the disclosed embodiments relate to trust computation methods and systems, and more particularly to performance-oriented trust computation methods and devices.

BACKGROUND

Computing power of various devices has increased exponentially over the years due to technological advancement in electronics hardware production and supporting software. Such devices in various computing infrastructures often operate to support peak computational demands, thereby causing a majority of the computing power to remain unused for a significant duration. In accordance with the related art, idle devices may be commoditized in a resource marketplace for sharing their computing power.

SUMMARY

Resource marketplaces may have three kinds of entities: users (i.e., entities requesting a task to be executed), resources (i.e., entities on which one or more tasks are executed), and resource owners (i.e., entities having custody of the resources). During interaction, trust among these entities poses a potential disruption to the modern cloud-based service delivery, since the users and resource owners may be unknown to each other. The related art includes various approaches to determine the trust among interacting entities.

In a first approach, the trust among the interacting entities is determined in multiple distributed computing environments, such as those related to Volunteer Computing (VC) and Peer-to-Peer (P2P) computing. In the VC environment, the resource owners donate their computing resources for a specific task. However, there is either no obligation or a limited obligation on the resource owners to deliver expected performance on the donated resources for performing the task. In the P2P computing environment, each peer or resource makes use of trust values for determining those peers from which files may be downloaded. These trust values are globally computed for each peer based on its history of uploads and are independent of each other.

In a second approach, the trust among entities is determined by leveraging pre-established trust formed through friend relationships in a social network, which is used to share resources among the users. In one example, a relationship distance (such as, based on whether a user is spouse, a family member, a first connection, a second connection, etc., of another user) in a social network is used for computing trust levels among the users. In another example, predefined relationships of trust (such as, based on whether a user has the other user in the friend list) are used for sharing resources among the users.

A third approach involves computing environments of different enterprises, which interact within a federated computing environment and rely upon a trust service (e.g., based on trusting only those resources that are located within a particular enterprise) to manage the interaction between federation partners.

The above approaches typically use trust metrics that compute trust between the interacting entities in isolation with each other, and do not support a computing performance guarantee among the interacting resources in the resource marketplace. It may therefore be beneficial to provide a reliable solution to compute performance-oriented trust among the interacting entities in the resource marketplace.

Some embodiments are therefore directed to methods and apparatus relating to trust computation for resource marketplace system involving computation of trust levels among the entities in a resource marketplace, such as by incorporating various aspects of the interactions among these entities. The exemplary resource marketplace may have three types of entities: users with task requests; resources on which the task is executed; and resource owners. The exemplary system allows for three kinds of trust queries over these entities: (1) for a user, a trust indexing of resources or resource owners; (2) for a resource owner, a trust indexing of users; and (3) detecting communities of trusted entities.

In accordance with some embodiments, the trust computation is derived from an interaction graph between the entities in the resource marketplace. The interaction graph has nodes representing the entities, for example, users, resources or resource owners; and the edges and their weights capture relationships or interactions among the entities. The interaction graph may be created by a graph induction module. The graph induction module may use different weighting functions to assign edge weights to the interaction graph. These weighing functions may consider historical usage patterns in the resource marketplace, as well as geographical, organizations or social network relationships among users and resource owners.

The created interaction graph may be used by a spectral analysis module for computing trust indices. Spectral analysis may perform trust computation using spectral graph analysis of the interaction graph. Specifically, the spectral analysis may compute a spectral or Laplacian embedding of the interaction graph that preserves the local neighborhood structure and connectivity of the interaction graph. Given an entity or node in the resource marketplace, the trust indices for other entities are computed by finding and ranking the Euclidean distances between the respective graph nodes in the embedded space.

Computing trust between a pair of entities using their distance in the Laplacian embedding space may be advantageous because it simultaneously considers all possible paths or connections between those entities in the original interaction graph, and it is scalable to a large number of trusted queries. Once the embedding is computed for the interaction graph, it may be used to quickly compute the trust levels between any pair of entities.

One exemplary embodiment includes a method for computing trust index among a plurality of entities associated with a resource marketplace. The method includes receiving a plurality of inputs including interaction attributes, attribute importance factors, references to databases, and a plurality of entities associated with the resource marketplace. The method also includes creating a weighted-interaction graph based on the received plurality of inputs. The weighted-interaction graph includes a plurality of vertices representing the plurality of entities. The method further includes performing a topology-specific analysis of the weighted-interaction graph. The method furthermore includes computing Euclidean distances for each pair of vertices among the plurality of vertices in the weighted-interaction graph based on the performed analysis. The method also includes determining a trust index for a first entity in the received plurality of entities based on the computed Euclidean distances. The trust index includes ranking of at least one of the plurality of entities with respect to the first entity. The ranking is inversely proportional to the computed Euclidean distances.

Another embodiment includes a device for computing trust index for at least one entity interacting with a plurality of entities associated with a resource marketplace. The device includes a database, a graph induction module, and a graph analysis module. The database includes profiles and historical usage information for the plurality of entities. The graph induction module is configured to: (1) receive a plurality of inputs including at least one of the plurality of entities, interaction attributes, attribute importance factors for each of the interaction attributes, and a reference to the database; and (2) create a weighted-interaction graph based on the plurality of inputs. The integration graph includes vertices representing the at least one entity and the plurality of entities. The graph analysis module is configured to: (1) perform a topology-specific analysis of the weighted-interaction graph; (2) compute Euclidean distances for each pair of vertices in the weighted-interaction graph based on the performed topology-specific analysis; and (3) determine a trust index for the at least one entity based on the computed Euclidean distances. The trust index includes ranking of at least one of the plurality of entities with respect to the at least one entity. The ranking is inversely proportional to the Euclidean distances.

Yet another embodiment includes a non-transitory computer-readable medium comprising computer-executable instructions for computing trust index among a plurality of entities associated with a resource marketplace. The non-transitory computer-readable medium includes instructions for receiving a plurality of inputs including interaction attributes, attribute importance factors, instances of accessible databases, and a plurality of entities associated with the resource marketplace. The non-transitory computer-readable medium also includes instructions for creating a weighted-interaction graph based on the received plurality of inputs, wherein the weighted-interaction graph includes vertices being represented by the plurality of entities. The non-transitory computer-readable medium further includes instructions for performing a topology-specific analysis of the weighted-interaction graph. The non-transitory computer-readable medium furthermore includes instructions for computing Euclidean distances for each pair of vertices in the weighted-interaction graph based on the performed analysis. The non-transitory computer-readable medium also includes instructions for determining a trust index for a first entity in the received plurality of entities based on the computed Euclidean distances. The trust index includes ranking of at least one of the plurality of entities with respect to the first entity. The ranking is inversely proportional to the Euclidean distance.

Other and further aspects and features of the disclosure will be evident from reading the following detailed description of the embodiments, which are intended to illustrate, not limit, the present disclosure.

BRIEF DESCRIPTION OF THE DRAWINGS

FIG. 6 is a table illustrating exemplary weighting functions for use by the trust computation device of FIG. 1, according to an embodiment of the present disclosure;

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Non-Limiting Definitions

In various embodiments of the present disclosure, definitions of one or more terms that will be used in the document are provided below.

A "user device" is used in the present disclosure in the context of its broadest definition. The user device may refer to a networked computing device configured to at least one of (1) store, manage, or process data or documents, (2) establish a communication channel or environment, and (3) request services from or deliver services to, or both, other devices connected to the network. Various examples of the user device include a desktop PC, a personal digital assistant (PDA), a server, a mainframe computer, a mobile computing device (e.g., mobile phones, laptops, etc.), an internet appliance, etc.

A "resource marketplace" is used in the present disclosure in the context of its broadest definition. The resource marketplace may refer to a computing environment including a group of interconnected computing devices that communicate with each other over a network.

A "trust index" is used in the present disclosure in the context of its broadest definition. The trust index may refer to a list of ranked one or more entities associated with a resource marketplace, in which the rank of each of the entities represents the trust level of that entity with respect to a reference entity.

The numerous references in the disclosure to a stress assessment device are intended to cover any and/or all devices capable of performing respective operations on the person in a customer-interacting environment relevant to the applicable context, regardless of whether or not the same are specifically provided.

Exemplary Embodiments

Figure 1:
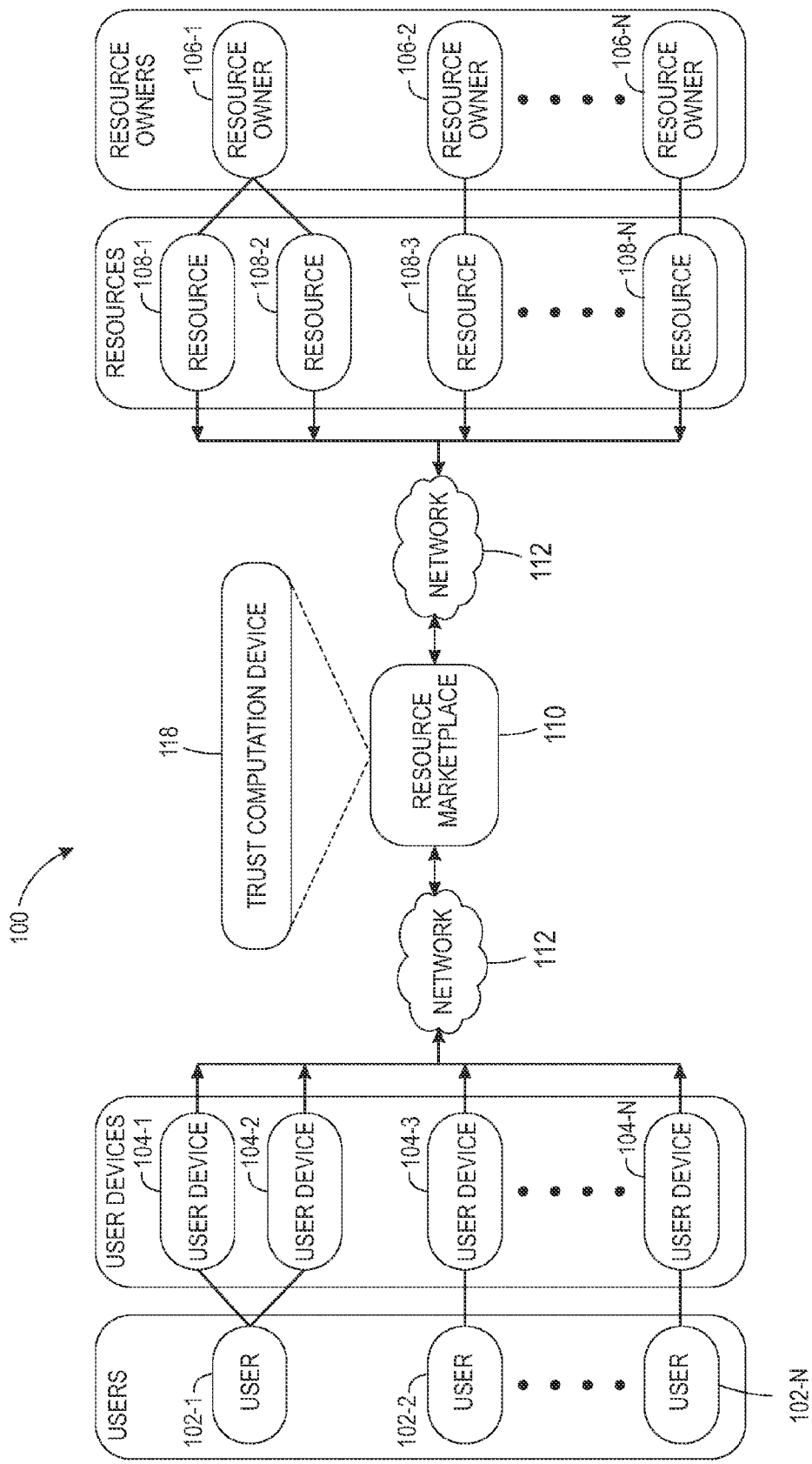
FIG. 1 is a schematic that illustrates a first network environment including an exemplary trust computation device, according to an embodiment of the present disclosure.

FIG. 1 is a schematic that illustrates a first network environment 100 including an exemplary trust computation device, according to an embodiment of the present disclosure. The first network environment 100 includes various entities, namely, multiple users 102-1, 102-2, . . . 102-N (collectively, users 102), a first set of user devices 104-1, 104-2, 104-3, . . . , 104-N (collectively, first set of user devices 104), multiple resource owners 106-1, 106-2, . . . , 106-N (collectively, resource owners 106), and multiple resources 108-1, 108-2, 108-3, . . . , 108-N (collectively, resources 108). Each of the users 102 may be associated with one or more of the first set of user devices 104. For example, the user 102-1 may be associated with multiple user devices 104-1 and 104-2, and the user 102-2 may be associated with the single user device 104-3. Similarly, each of the resource owners 106 may be associated with one or more resources 108. For example, the resource owner 106-1 may be associated with multiple resources 108-1 and 108-2, and the resource owner 106-2 may be associated with the single resource 108-3. The first set of user devices 104 and the resources 108 may be implemented as any of a variety of computing devices, including, for example, a server, a desktop PC, a notebook, a workstation, a personal digital assistant (PDA), a mainframe computer, a mobile computing device, a network appliance, and so on.

The first network environment 100 further includes a resource marketplace (RM) 110 that facilitates communication between the first set of user devices 104 and the resources 106 over a network 112. Some of the disclosed embodiments include or otherwise involve data transfer among the first set of user devices 104, the resources 106, and the resource marketplace 110 over the network 112, such as communicating various inputs over the network 112. The network 112 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network 112 may include multiple networks or sub-networks, each of which may include, for example, a wired or wireless data pathway. The network 112 may include a circuit-switched voice network, a packet-switched data network, or any other network be to carry electronic communications. For example, the network 112 may include networks based on the Internet protocol (IP) or asynchronous transfer mode (ATM), and may support voice using, for example, VoIP, Voice-over-ATM, or other comparable protocols used for voice data communications. In some embodiments, the network 112 may include a cellular telephone network configured to enable exchange of text or SMS messages.

Figure 2A:
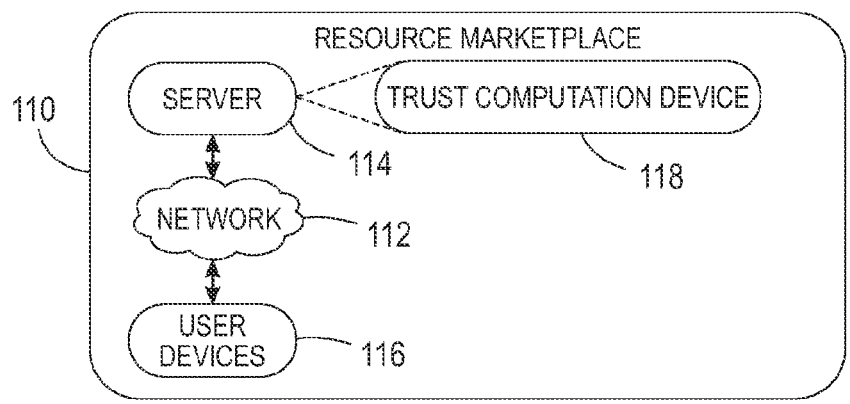
FIGS. 2A-2C are schematics that illustrate a resource marketplace including the trust computation device of FIG. 1, according to an embodiment of the present disclosure.
Figure 2B:
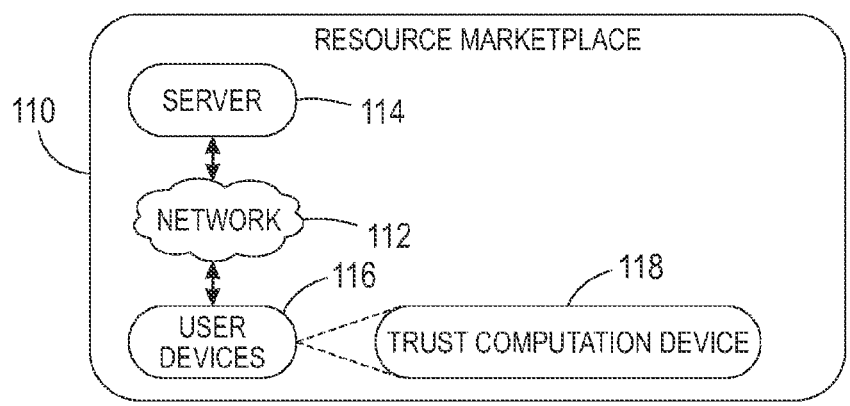
Figure 2C:
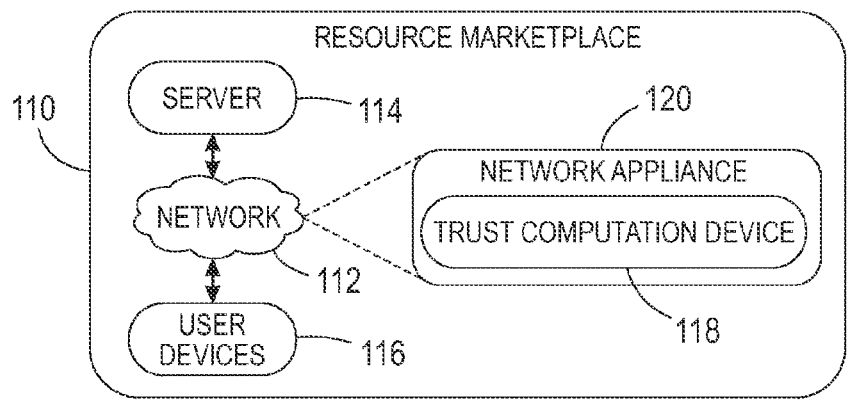

The resource marketplace 110 may refer to a computing environment including a group of interconnected computing devices that communicate with each other over the network 112. These computing devices may include a variety of known, related art, or later developed devices, including those mentioned above. As shown in FIGS. 2A-2C, the resource marketplace may include various computing devices such as a server 114 and a second set of user devices 116. Each of the computing devices including the server 114 and the second set of user devices 116 may be configured to store, manage, or process instructions or data, and establish communication between the first set of user devices 104 and the resources 108 based on predefined service level agreement (SLA) parameters, such as data uplink and downlink bandwidth, monetary exchange per process/application execution, service duration, etc. The server 114 may be implemented as any of a variety of computing devices including, for example, a general purpose computing device, multiple networked servers (arranged in clusters or as a server farm), a mainframe, or so forth. The second set of user devices 116 may be implemented as any of a variety of computing devices such as those mentioned above.

In the first network environment 100, the resource marketplace 110 may include a trust computation device 118 configured to compute the trust among various RM entities including, but not limited to, the users 102, the first set of user devices 104, the resources 108, the resource owners 106, the server 114 and the second set of user resources 116. Trust may be defined to be a weighted composition of multiple factors like historical resource usage patterns, organizational relationships as well as inter and intra-group social network interactions among the RM entities. In an embodiment, these factors may be modeled as an undirected graph of interactions and relationships between different RM entities interacting via the resource marketplace 110. The graph may represent both direct and indirect interactions between the users 102 (or the corresponding first set of user devices 104) and the resource owners 106 (or the corresponding resources 108), where indirect connectivity may be modeled by paths of different lengths. The paths may be explicitly assigned weights depending on preferences of the users 102, where the preferences may be submitted using the first set of user devices 104, thereby providing a personalized and dynamic determination of trust among the RM entities. The weighted-graphs may be used to determine a bi-directional trust index among different RM entities. The trust index may enable: (1) user-specific trust ranking of the resources 108, (2) resource owner-specific trust ranking of the users 102, and (3) detection of communities to which each of the RM entities are associated. Such computation of trust using weighted graphs-based modeling of the network environment 100 involving the resource marketplace 110 is discussed below in greater detail.

The trust computation device 118 may represent any of a wide variety of devices that can provide trust computation services for the RM entities. The trust computation device 118 may be implemented as a standalone and dedicated "black box" including hardware and installed software, where the hardware is closely matched to the requirements and/or functionality of the software. Alternatively, the trust computation device 118 may be implemented as a software application or a device driver. The trust computation device 118 may enhance or increase the functionality and/or capacity of the network 112 to which it is connected. The trust computation device 118 may be configured, for example, to perform e-mail tasks, security tasks, network management tasks including IP address management, and other tasks. In some embodiments, the trust computation device 118 is configured to expose its computing environment or operating code to an end user, and may include related art I/O devices, such as a keyboard or display. The trust computation device 118 of some embodiments may, however, include software, firmware or other resources that support remote administration and/or maintenance of the trust computation device 118.

The trust computation device 118 may be integrated with, or installed on, at least one of the server 114 (FIG. 2A), the second set of user devices 116 (FIG. 2B), and a network appliance 120 (FIG. 2C) that is used to establish the network 112 in the resource marketplace 110. In some embodiments, the trust computation device 118 may be installed on or integrated with any network appliance 120 configured to establish the network 112 between the first set of user devices 104 and the resources 108.

Any of the second set of user devices 116, the server 114, and the network appliance 120 may be capable of operating as an interface device to assist exchange of software instructions and data between the first set of user devices 104 and the resources 108. In some embodiments, the network appliance 120 may be preconfigured or dynamically configured to include the trust computation device 118 integrated with other devices. For example, the trust computation device 118 may be integrated with at least one of the second set of user devices 116 or any other user device (not shown) connected to the network 112. The at least one of the second set of user devices 116 may include a module (not shown), which enables that user device being introduced to the network appliance 120, thereby enabling the network appliance 120 to invoke the trust computation device 118 as a service. Examples of the network appliance 120 include, but are not limited to, a DSL modem, a wireless access point, a router, a base station, and a gateway having a predetermined computing power sufficient for implementing the trust computation device 118. In some other embodiments, the resource marketplace 110, including the trust computation device 118, may provide trust computation as a service to other resource marketplaces.

Figure 3:
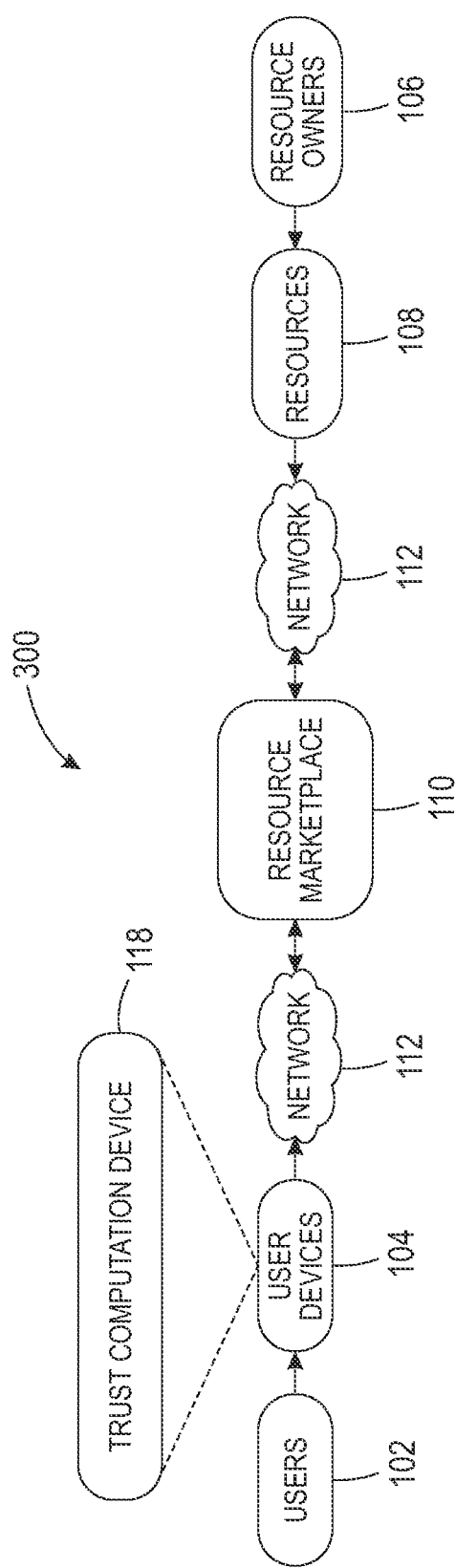
FIG. 3 is a schematic that illustrates a second network environment including the trust computation device of FIG. 1, according to an embodiment of the present disclosure.

In a second network environment 300 (FIG. 3), the trust computation device 118 may be integrated with, or installed on, at least one of the first set of user devices 104 such as the user device 104-1. In some embodiments, the trust computation device 118 may be configured to compute the trust between the user devices 104, or the corresponding users 102, and other RM entities. For example, the user device 104-1 may include the trust computation device 118 and may provide trust computation service to the other users 102, the resource marketplace 110, the resources 108, and the resource owners 106. In some other embodiments, at least one of the first set of user devices 104 and the resources 108 may be part of the resource marketplace 110.

Figure 4A:
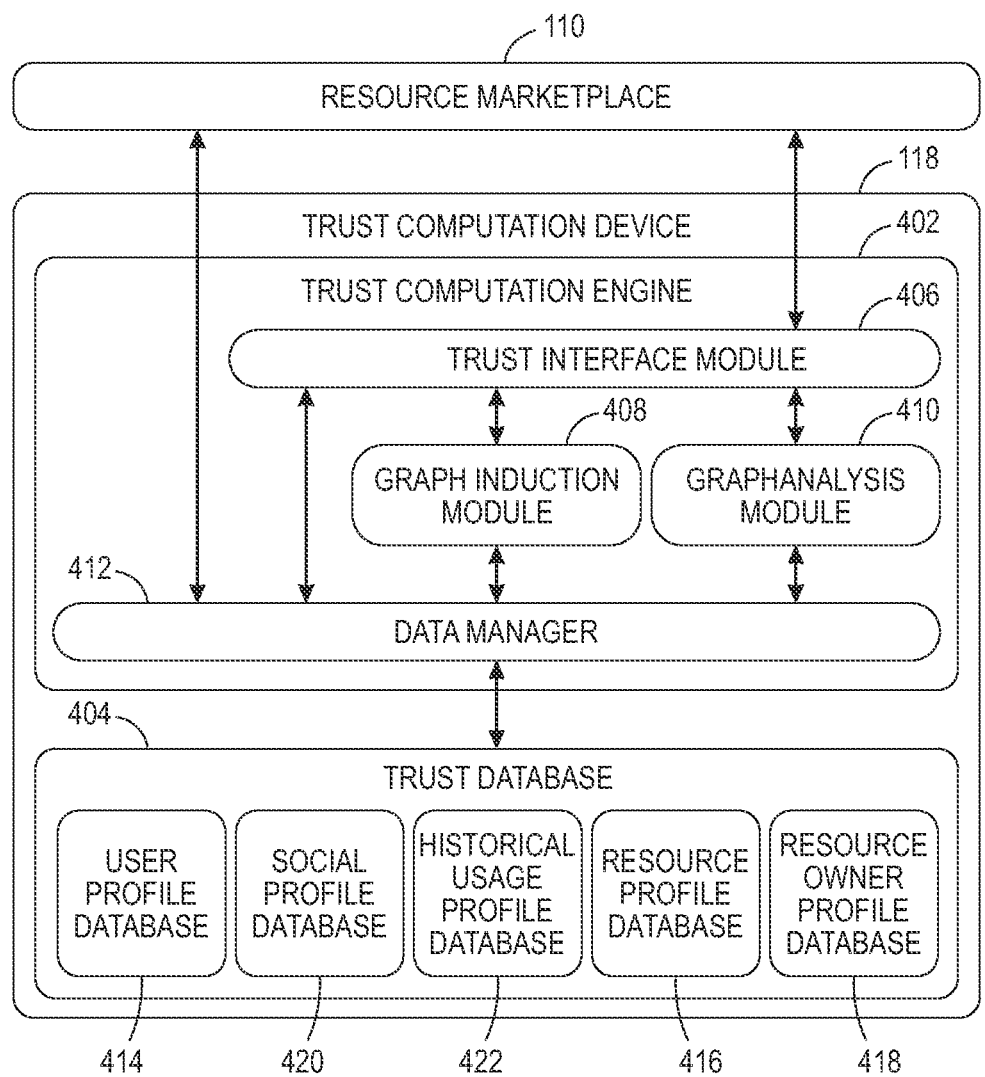
FIG. 4A is a schematic that illustrates the exemplary trust computation device of FIG. 1 in communication with a resource marketplace, according to an embodiment of the present disclosure.

FIG. 4A is a schematic that illustrates the exemplary trust computation device 118 in communication with the resource marketplace 110, according to an embodiment of the present disclosure. The trust computation device 118 may include a trust computation engine 402 in communication with trust database 404 and the resource marketplace 110. The trust computation engine 402 may be configured to compute the trust among the RM entities interacting over the resource marketplace 110 based on analysis of the weighted-graphs formed by modeling the interactions among the RM entities. The trust computation engine 402 includes a trust interface module 406, a graph induction module 408, a graph analysis module 410, and a data manager 412.

The trust database 404 may include or sub-divided into various databases including, but not limited to, a user profile database 414, a resource profile database 416, a resource owner profile database 418, a social profile database 420, and a historical usage profile database 422. The user profile database 414 may store basic information about the users 102, such as the user's name, organization and location. The resource profile database 416 may store information about the resources 106, such as its configuration and location. The resource owner profile database 418 may store information about the resource owners 106, such as the owner's name, location, organization, and the list of owned resources. The social profile database 420 may store information about the social connection among the users 102 and resource owners 106, such as, friendship distance on social media sites, being part of the same or related organizations. The historical usage profile database 422 may store information about the tasks scheduling and resource usage in resource marketplace 110. In particular, the historical usage profile 422 may include, but not limited to, tasks generated by each of the users 102, each of the resources 108 in which a task is scheduled, task SLA parameters, a user's rating after execution of a task on the resources 108, and a resource owner's rating of user's task execution.

Figure 4B:
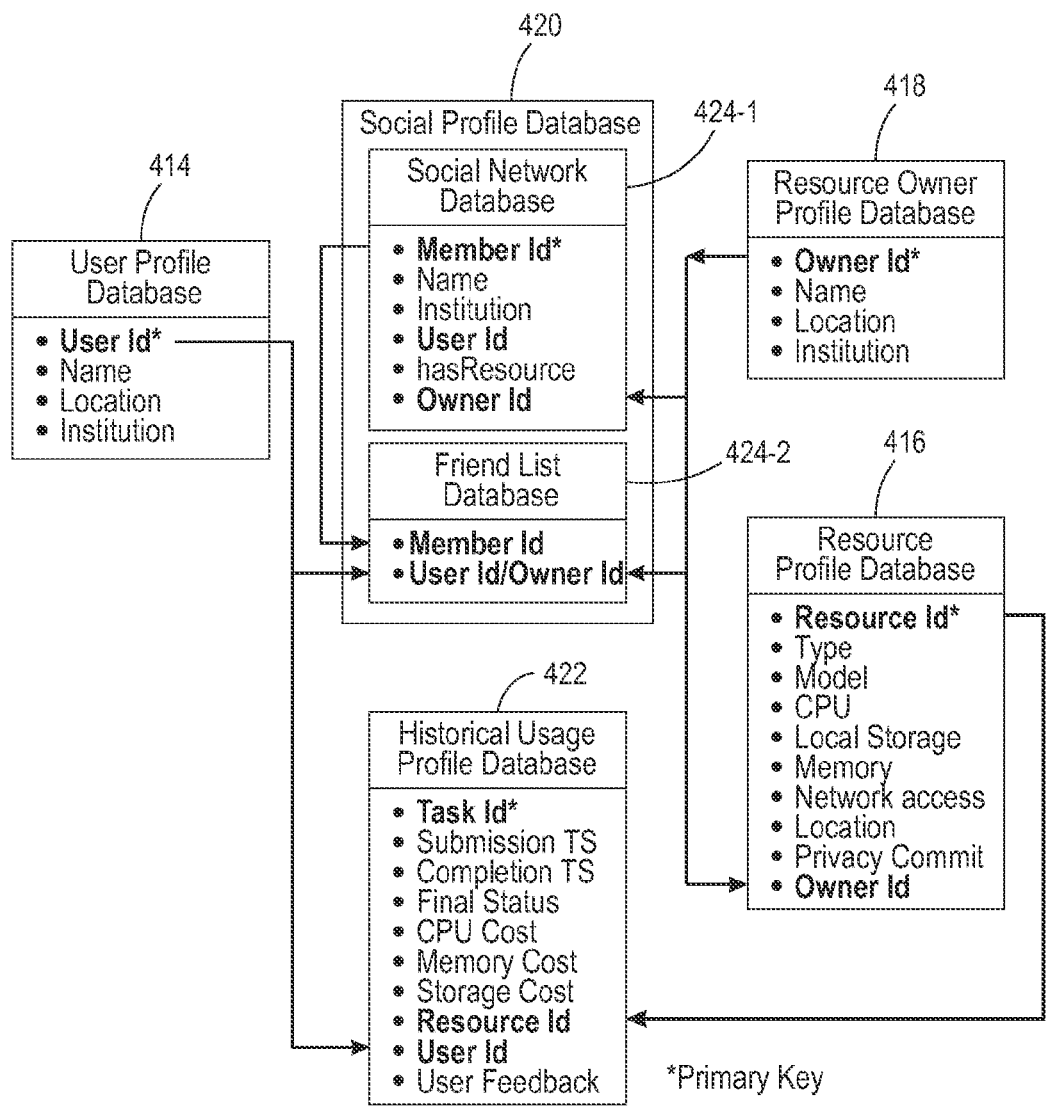
FIG. 4B is a schematic that illustrates an exemplary database schema for use with trust computation device of FIG. 1, according to an embodiment of the present disclosure.

The trust database 404 may have one of many database schemas known in the art, related art, or developed later for induction of interaction graphs by the graph induction module 408. In one embodiment shown in FIG. 4B, the trust database 404 may have a relational database schema involving at least one primary key attribute including one or more secondary attributes in each database. For example, the user profile database 414 may have a primary key attribute 'User Id' with secondary attributes 'name', 'location, and 'institution'. Each primary key attribute of one database may be related to one or more primary key attributes of another database. For example, a primary key attribute 'Owner Id' in the resource owner profile database 418 may be related to a primary key attribute 'Owner Id' in the resource profile database 416. Further, each database in the trust database 404 may be further divided into sub-databases, each having a primary key attribute along with secondary attributes. For example, the social profile database 420 may be divided into sub-databases 424-1 and 424-2, each having a primary key-attribute 'Member Id'. The primary key attributes of the sub-databases may be same or different.

The trust interface module 406 may coordinate interactions of the trust computation engine 402 with the resource marketplace 110 interacting with the RM entities including the users 102, the resources 108, and the resource owners 106, over the network 112. The trust interface module 406 may include a variety of known, related art, or later developed interfaces, including software interfaces, for example, an application programming interface, a graphical user interface, etc.; hardware interfaces, for example, cable connectors, a keyboard, a card reader, an interactive display screen, etc.; or both.

The data manager 412 may manage interactions of the trust computation engine 402 with the trust database 404. In some embodiments, the data manager 412 may also be configured to directly interact with the resource marketplace 110, such as, for updating the trust database 404. These interactions may include (1) queries from the trust database 404 to the graph induction module 408 and the graph analysis module 410, and (2) instructions or data from at least one of the resource marketplace 110, the trust interface module 406, the graph induction module 408, and the graph analysis module 410 to the trust database 404.

The data manager 412 may include at least one processor (not shown) executing machine readable program instructions for analyzing these interactions. The data manager 412 may include, in whole or in part, a software application working alone or in conjunction with one or more hardware resources. Such software applications may be executed by the processor on different hardware platforms or emulated in a virtual environment. Aspects of the data manager 412 may leverage known, related art, or later developed off-the-shelf software. The processor may include, for example, microprocessors, microcomputers, microcontrollers, digital signal processors, central processing units, state machines, logic circuits, and/or any devices that manipulate signals based on operational instructions. Among other capabilities, the processor may be configured to fetch and execute computer readable instructions in the data manager memory.

The data manager 412 may be configured to convert communications, which may include instructions, queries, data, etc., from the trust computation engine 402 and the resource marketplace 110 into appropriate formats to make these communications compatible with the trust database 404. Consequently, the data manger 412 may allow implementation of the trust database 404 using different technologies or by different organizations, for example, a third-party vendor, managing a particular trust database using a proprietary technology.

Figure 5:
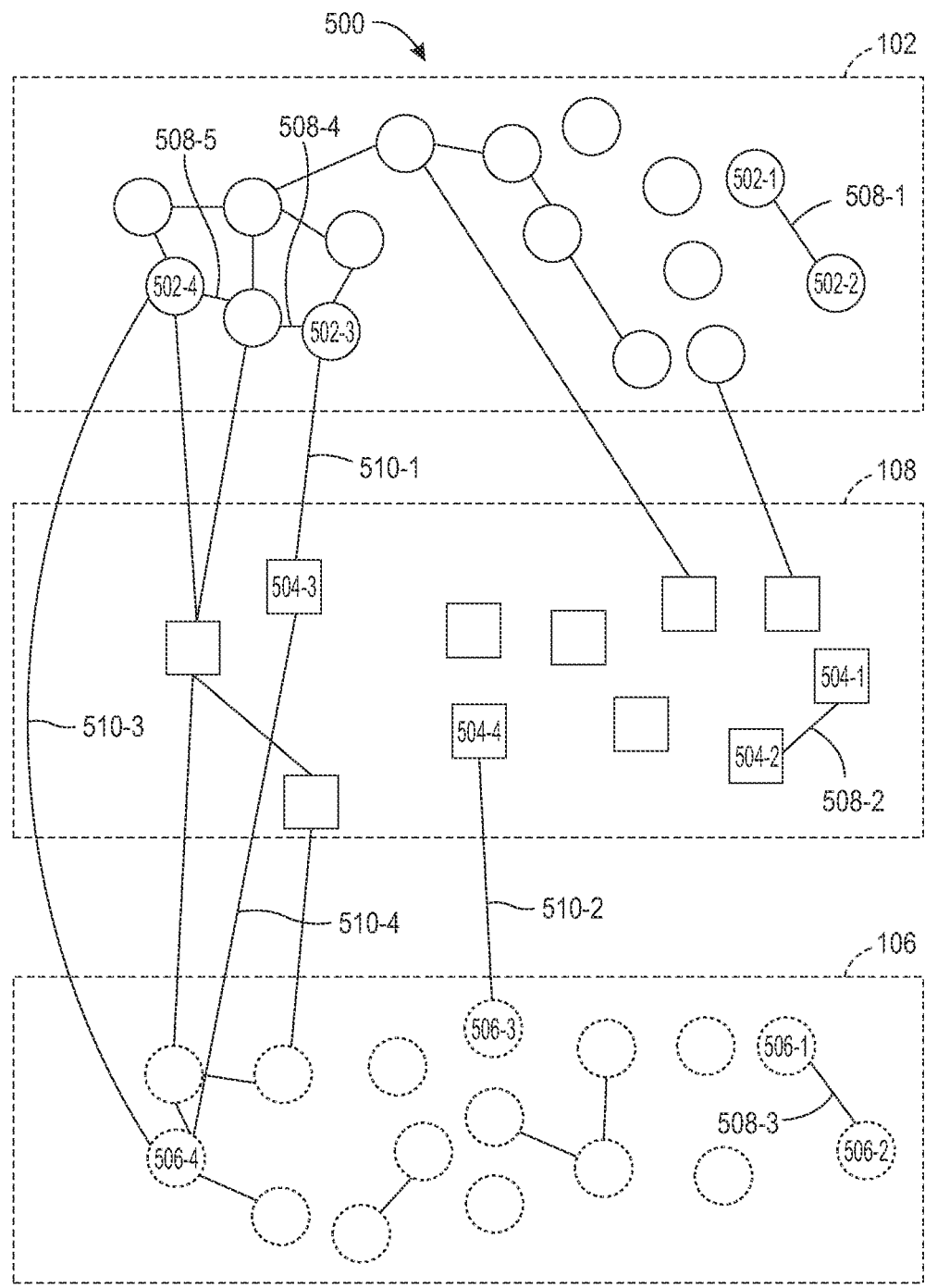
FIG. 5 is a schematic that illustrates an exemplary interaction graph generated by the trust computation device of FIG. 1, according to an embodiment of the present disclosure.

The graph induction module 408 may be configured to construct one or more interaction graphs based on interactions among the RM entities and may assign appropriate edge weights in the graph. Each edge weight is representative of an interaction between any two RM entities, such as a particular user and a specific resource. In an embodiment, the graph induction module 408 implements a domain-specific modeling methodology on the interaction graph for representing it as a weighted undirected graph. One such exemplary interaction graph 500 is shown in FIG. 5. The interaction graph 500 represents an undirected graph where each pair of vertices (or nodes) may have at least one undirected and positively-weighted edge connecting these vertices. The interaction graph 500 includes vertices, one or more vertex pairs, which may be connected by lines called as edges. The vertices represent RM entities associated with the resource marketplace 110, and the edges model the relationship among these RM entities. For example, the interaction graph 500 includes solid circular vertices such as 502-1, 502-2, 502-3, 502-4, . . . , so on (collectively, solid circular vertices 502) representing the users 102, square vertices such as 504-1, 504-2, 504-3, 504-4, . . . , so on (collectively, square vertices 504) representing the resources 108, and dashed circular vertices such as 506-1, 506-2, 506-3, 506-4, . . . , so on (collectively, dashed circular vertices 506) representing the resource owners 106.

The interaction graph 500 may include various types of edges based on the interaction among the RM entities. In one instance, a first set of edges 508-1, 508-2, 508-3, 508-4, 508-5, . . . , so on (collectively, first set of edges 508) may model interaction or connectivity between the same type of vertices, for example, user-user edges such as the edge 508-1, resource-resource edges such as the edge 508-2, and owner-owner edges such as the edge 508-3. The first set of edges 508 capture the relationship between the same types of RM entities based on their profile attributes, for example, the first set of edges 508 may model an interaction between the users 102 belonging to the same organization or social group. In another instance, a second set of edges 510-1, 510-2, 510-3, 510-4, . . . , so on (collectively, second set of edges 510) may model interaction between different type of vertices, for example, user-resource edges (or, U-R edges) such as the edge 510-1, resource-resource owner edges (or, R-RO edges) such as the edge 510-2 and 510-4, and resource owner-user edges (or, RO-U edges) such as the edge 510-3.

The U-R edges may represent historical usage patterns of a particular resource by a specific user associated with the resource marketplace 110. These U-R edges may allow computing trust among the RM entities based on historical experience of a user with a resource. Each of the R-RO edges and the RO-U edges may represent dual relationships since they model (1) ownership of a particular resource, and (2) those scenarios where any particular user may also own one or more resources. So in some embodiments, the users 102 may behave as the resource owners 106, such that the respective first set of user devices 104 may represent the resources 108; hence the solid circular vertices 502 may be represented as the dashed circular vertices 506 and vice versa, in the graph 500.

The graph induction module 408 may be further configured to assign positive edge weights to the first set of edges 508 and the second set of edges 510. These edge weights may be normalized from '0' to '1', where '0' may denote no direct connectivity, and '1' may denote very strong connectivity or relationship between the edge end-points or vertices, which represent the RM entities associated with the resource marketplace 110. Although these edge weights may reflect direct relationship between the RM entities, the overall graph structure or the graph topology may capture indirect interactions for defining the trust index. In one example, the edges 510-1 and 510-4 depict indirect relationship between a user corresponding to vertex 502-3 and a resource owner corresponding to the vertex 506-4. Similarly in another example, the edges 508-4 and 508-5 depict indirect relationship between the users corresponding to vertices 502-3 and 502-4.

The edge weights may be determined using various weighting functions, for example, those shown in a table 600 of FIG. 6. The table 600 includes columns 602, 604 and rows 606-1, 606-2, . . . , 606-6. The column 602 shows various edge categories with the corresponding weighting functions in the column 604. The row 606-1 shows a User-User weighting function (fuu) that may consider various attributes. Examples of these attributes include social (representing social network connectivity between the users 102), location (representing closeness between geographical locations of the users 102), and organization (representing organizational affiliation of the users 102). These attributes may have binary values '0' if any pair of users shares no connectivity with each other and '1' if the pair of users has connectivity based on a predetermined relationship criteria. For example, the attribute 'social' may have a value '1' if any two users are connected via a social network having, for e.g., a friendship distance or connection level less than 3; the attribute 'location' may have a value '1' if two users are staying in the same geographical vicinity; and the attribute 'organization' may have a value '1' if two users belong to the same organization; the values of these attributes may be '0', otherwise. An exemplary formulation of fuu is given in Equation 1:

$$\{uu\_edge\_weight=0.3*social+0.2*location+0.5*organization\} \qquad (1)$$

In Equation 1, [0.3 0.2 0.5] are attribute importance factors, which may be set in any proportion for each of the attributes based on the above factors such that the attribute importance factors sum to one. Hence, the output of the function in Equation 1 may vary from '0' to '1'.

Similar to Equation 1, an Owner-Owner weighting function (foo) as shown in the row 606-2 may be formulated to have different possible attribute importance factors, for example, [0.1 0.2 0.7], where the sum of the attribute importance factors is one.

Further as shown in the row 606-3, a Resource-Resource weighting function (frr) may have two binary input attributes, namely, location and capability. A value of the attribute 'location' may be '1' if any two resources belong to the same geographical location, else the value '0'. The attribute 'capability' may have a value '1' if any two resources have the same or similar hardware profiles or computing capabilities, else the values may be '0'. For example, if a resource has the computing capability within 1 gigaFLOPS to 10 gigaFLOPS, then the attribute 'capability' may have the value '1', else the value '0'. An example formulation of frr is shown in Equation 2:

$$\{rr\_edge\_weight=0.3*location+0.7*capability\} \quad (2)$$

In Equation 2, [0.3 0.7] are the attribute importance factors, which may sum to '1'. Hence, the output of this function in Equation 2 may vary from '0' to '1'.

At the rows 606-4 and 606-6, an Owner-Resource weighting function and a User-Owner weighting function are shown, respectively. The Owner-Resource weighting function may return a positive predefined constant value (e.g., 0.2) if a given resource owner owns a given resource. Similarly, the User-Owner weighting function may return a predefined constant value (e.g., 0.1), if a given user is also an owner, who owns the resource. The return value of both of these weighting functions may be '0' otherwise. In some embodiments, the constant value returned by these functions may vary from '0' to '1'.

The row 606-5 shows a User-Resource weighting function (fur) that models the historical resource usage experience of each pair of user-resource entity. In one example, the function fur may consider an attribute 'usage_freq' representing a frequency of past interactions and an attribute 'avg_feedback' representing an average user feedback that may provide a measure of success rate of task executions. The user feedback may be either explicitly fed by the users 102 or the resource owners 106, or implicitly computed using the average task size (e.g., by CPU, memory and storage usage) and the job execution statistics (such as, completion time). The user feedback may include a user's rating after execution of a task on a particular resource, and a resource owner's rating of user's task execution. In some embodiments, the interaction or usage frequency may be normalized by a predetermined maximum value for a given database associated with the trust database 404, and the user feedback may be normalized by varying it within a fixed range, for example, from '0' to '1', where '0' may represent the worst rating and '1' may represent the best rating. An example formulation of fur is shown in Equation 3:

$$\{ur\_edge\_weight=normalized\_usage\_freq* \\ normalized\_avg\_feedback\} \quad (3)$$

In Equation 3, both the attributes 'usage_freq' (i.e., usage frequency) and 'avg_feedback' (i.e., user feedback) may vary from '0' to '1', and hence, the output of this function in Equation 3 may vary from '0' to '1'.

Such weighting functions, the attributes, the attribute importance factors, and the corresponding relationship criteria may be preconfigured or dynamically configured at the graph induction module 408 via the trust interface module 406 based on various scenarios including, but not limited to, tasks to be executed, service level agreements imposed for or between the interacting RM entities, the historical resource usage pattern of the users, etc. Each of the attributes may be associated with different attribute importance factor based on these scenarios for computing the edge weights. For example, the attribute 'usage_freq' representative of the historical resource usage patterns may be given lower importance represented by its removal or by giving a small-value to its corresponding attribute importance factor; and higher preference may be given to a resource belonging to the same organization/geographical location by associating a higher-valued attribute importance factor with the attributes 'location' and 'organization', or vice-versa. Therefore, different entity attributes may act as parameters to the weighting functions where these attributes along with their relative attribute importance factors may be used to generate a positive real value as the edge weight. For example, fuu function (that is used to compute user-user edge weights) may have three input parameter attributes. So for a given pair of users, a positive value ranging from '0' to '1' may be first assigned to each attribute based on their similarity (e.g., affiliation to same organization) and later a weighted linear combination of these values may be computed along with respective attribute importance factor in order to compute a real positive weight value. These attribute importance factors may be explicitly provided to the graph induction module 408 from an entity, such as the server 114 or the first set of user devices 104, associated with the resource marketplace 110 via the trust interface module 406. Since these attributes may be changed according to an intended application, the edge weights may be recomputed in fixed temporal cycles or on specific request from one or more RM entities associated with the resource marketplace 110.

The graph induction module 408 may generate the interaction graph, such as the interaction graph 500, including edge weights from the above weighted graph modeling of the RM entities associated with the resource marketplace 110. The topology of the interaction graph may be defined by set of edges, and the quality of interaction between the RM entities may be captured by edge weights. With respect to a particular edge weight, a relatively greater edge weight may indicate a stronger interaction and relationship between any two RM entities. For example, an edge weight '1' assigned to a user-resource edge may indicate a satisfactory historical interaction and an edge weight '0' may indicate an unsatisfactory historical interaction between any two RM entities. The graph induction module 408 may feed the generated weighted interaction graph to the graph analysis module 410.

The graph analysis module 410 may be configured to receive the weighted interaction graph from the graph induction module 408 via the data manager 412. The graph analysis module 410 may be further configured to perform an implicit analysis such as a spectral analysis of the received interaction graph to compute trust indices among the RM entities by computing a spectral (Laplacian) embedding of the interaction graph. This spectral analysis technique enables a topology-centric analysis of the interaction graph, thereby capturing the overall connectivity between any pair of graph vertices as opposed to the shortest path (i.e., geodesic distance) or local neighborhood traversal techniques.

The spectral embedding of the interaction graph, for example, with 'N' number of vertices, involves each graph vertex being mapped to a K-dimensional space spanned by a first K non-null Eigenvectors of the graph Laplacian matrix. 'K' refers to an embedding dimension parameter that provides a measure of a limited set of vertices among the N vertices in the graph. The value of 'K' may be predefined in the graph analysis module 410 in some embodiments; however, other embodiments may involve the graph analysis module 410 being configured to dynamically receive the value of 'K' from one of the RM entities via the trust interface module 406. The value of 'K' may be smaller than 'N' in order to reduce computational complexity. The graph analysis module 410 may also be configured to compute Euclidean distances between the graph vertices in the K-dimensional spectral embedding space for trust computation.

The Euclidean distances represent the average connectivity between any two graph vertices representing the RM entities in the interaction graph. Such average connectivity is inversely proportional to the number of edges and length of these edges between a pair of vertices in the interaction graph and may be used as a measure of trust between the RM entities. For example, a small Euclidean distance between any two RM entities in the K-dimensional embedding space reflects a strong average connectivity between them over the interaction graph. Based on the determined trust, the RM entities may be ranked by the graph analysis module 410 to create a trust index for the ranked RM entities.

The graph analysis module 410 may compute the trust based on different types of trust queries received via the trust interface module 406 from the RM entities, such as the users 102, associated with the resource marketplace 110. In a first example, for a given reference user, for example, the user 102-1, the graph analysis module 410 may receive a first trust query for retrieving a trust index (or trust ranking) of various resources or resource owners. The retrieved trust index may be used for scheduling a task from the reference user to be executed on the resources that are well-trusted (e.g., represented by the trust index or ranking above a certain threshold) by the reference user. The graph analysis module 410 may execute the received trust queries by computing the sorted Euclidean distances between the reference user and all the resource vertices mapped in the K-dimensional spectral embedding space, as discussed above.

In a second example, for a given resource owner, such as the resource owner 106-1, the graph analysis module 410 may receive the second trust query for retrieving a trust index (or trust ranking) of various users. The retrieved trust index may be used for determining tasks of which users 102 are executed on one or more resources such as the resources 108-1 and 108-2, associated with the given reference resource owner. Accordingly, the reference resource owner may provide privileged access over its resources (e.g., access to operating system kernel calls) for well-trusted users 102. Also, since the interaction graph is undirected, the relationships represented by the edges in the graph are bi-directional. Hence, the computation for the second trust query is similar to the first trust query, and may not require additional computational efforts except the sorting of the user vertices based on their Euclidean distances (in the K-dimensional spectral embedding space) from a reference resource vertex.

In a third example, the graph analysis module 410 may receive a third trust query for detecting communities among the RM entities. In one embodiment, each of the communities may include a set of users and resource owners, which have a high level of trust among them based on the determined trust index. In another embodiment, a community may include a set of users belonging to the same geographical location, organization, or those having common historical resource usage pattern. The third trust query may be executed using various methods known in the art, related art, or later developed. For example, the graph analysis module 410 may apply a K-means clustering algorithm on the K-dimensional spectral embedding of the interaction graph for trust-based community detection. The RM entities, such as the users 102, the resource owners 106, etc., may use the detected communities to improve their operation and provide higher quality services (for example, faster task scheduling, discounted transaction charges within communities, etc.) within these communities.

The graph analysis module 410 may execute the received trust queries in an offline configuration or an online configuration. In the offline configuration, the graph analysis module 410 may not be in communication with one or more RM entities. So in order to execute the trust queries in the offline configuration, the graph analysis module 410 may pre-compute the interaction graph representation and store pairwise Euclidean distances between each pair of vertices projected in the K-dimensional spectral embedding space. Based on the pre-computed interaction graph representation and the stored pairwise Euclidean distances, the graph analysis module 410 may compute trust indices with respect to every vertex. This computation of the trust indices may be periodically repeated in order to consider recent changes in the trust database 404. The graph analysis module 410 may optionally sort the computed trust indices for the RM entities being represented as the graph vertices.

On the other hand, the graph analysis module 410 may be in communication with all RM entities associated with the resource marketplace 110 in the online configuration. In this configuration, the historical resource usage information and other profile information may be continuously updated in the trust database 404 via the data manager 412. So for every ranking or trust query, the graph analysis module 410 may dynamically induce a new interaction graph depending on various inputs including, but not limited to, the attributes, attribute importance factors, the relationship criteria, etc., which may be received on-the-fly via the trust interface module 406.

Figure 7:
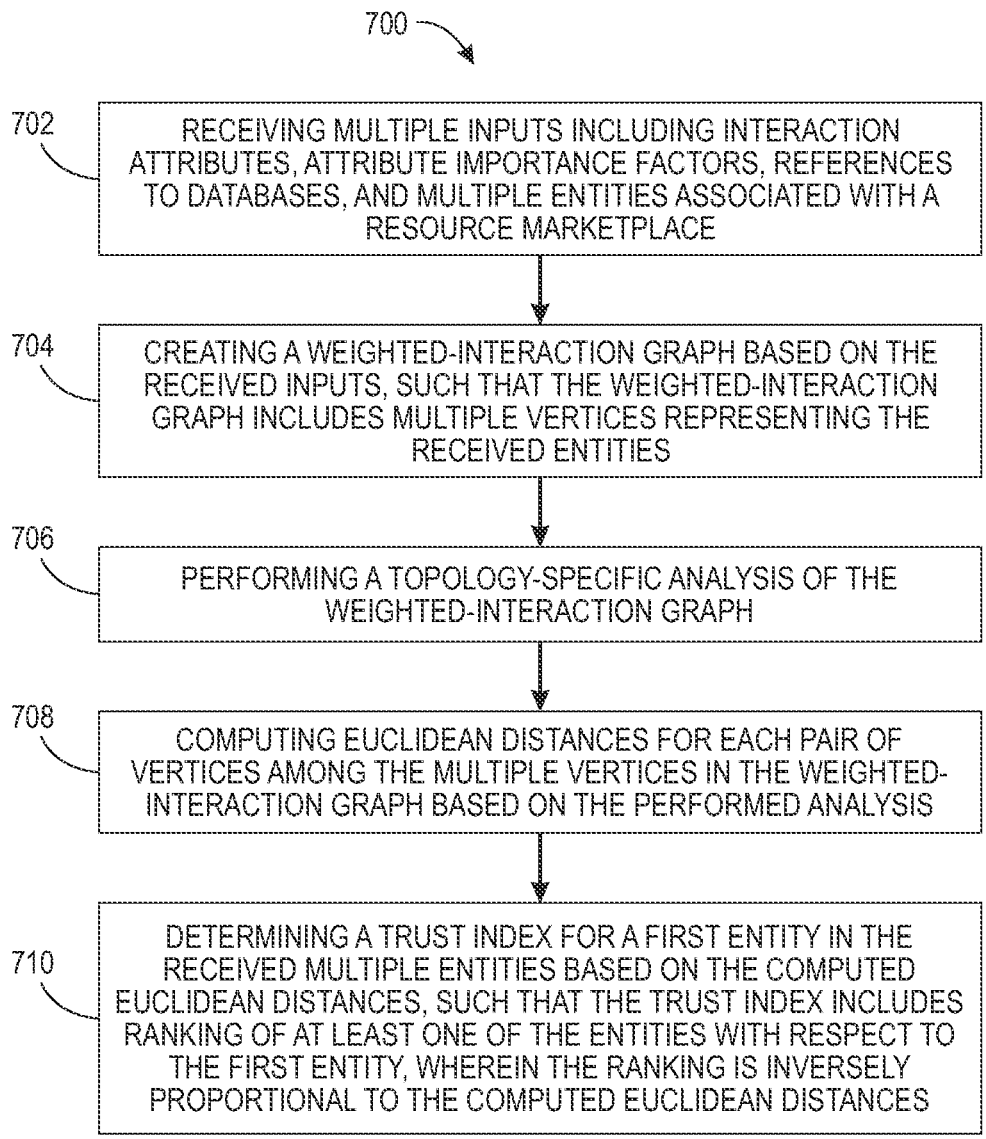
FIG. 7 is a flowchart that illustrates an exemplary method for implementing the trust computation device of FIG. 1, according to an embodiment of the present disclosure.

FIG. 7 illustrates an exemplary method 700 for implementing the trust computation device 118, according to an embodiment of the present disclosure. The exemplary method 700 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 700 is described is not intended to be construed as a limitation, and any number of the described method blocks may be combined or otherwise performed in any order to implement the method 700, or an alternate method. Additionally, individual blocks may be deleted from the method without departing from the spirit and scope of the present disclosure described herein. Furthermore, the method 700 may be implemented in any suitable hardware, software, firmware, or combination thereof, that exists in the related art or that is later developed.

The method 700 describes, without limitation, implementation of the exemplary trust computation device 118. One of skill in the art will understand that the method 700 may be modified appropriately for implementation in a various manners without departing from the scope and spirit of the disclosure.

At step 702, various inputs including interaction attributes, attribute importance factors, references to accessible databases, and instances of the RM entities associated with the resource marketplace are received. The trust computation device 118 may communicate with various RM entities including, but are not limited to, the users 102 via the first set of user devices 104, and the resource owners 106 via the resources 108 for trust computation among the RM entities. For this, the trust computation device 118 may receive the interaction attributes such as 'social' (representing social network connectivity), 'location' (representing closeness between geographic locations of the users), 'organization' (representing organizational affiliation of the users), etc. The trust computation device 118 may also receive the attribute importance factors, which provide a relative measure of a user's preferences for computing trust among various RM entities based on various factors. Examples of these factors include, but are not limited to, tasks to be executed, service level agreements imposed for or between the interacting RM entities, the historical resource usage pattern of the users 102, etc.

The trust computation device may further receive references to the trust database 404 including or associated with various databases, such as the user profile database 414, the social profile database 420, the historical usage profile database 422, the resource profile database 416, and resource owner profile database 418. Using these references, the trust computation device 118 may access the trust database 404 to (1) receive instances of the RM entities associated with the resource marketplace 110, (2) identify relationship between each pair of RM entities, and (3) operational history of the RM entities.

At step 704, a weighted interaction graph is created based on the received inputs with the received instances of the RM entities as vertices of the graph. The trust computation device 118 may be configured to create an undirected interaction graph having the instances of the RM entities as the vertices. Each of the vertices may be connected to one or more vertices by edges based on interaction between the corresponding RM entities. The edges may be assigned edge weights, which may have positive values normalized from '0' to '1', where '0' may denote no direct connectivity and '1' may denote the strongest connectivity.

The edge weights may be calculated using various weighting functions, which may be predefined or dynamically defined using the received inputs. The weighting functions may address interaction between different categories of the RM entities. For example, a first weighting function calculating edge weights between two 'user' vertices may be different from a second weighting function that may calculate edge weights between a 'user' vertex and a 'resource' vertex.

To calculate values of such weighting functions, the values of involved attributes may be calculated using the trust database 404 according to the various relationship criteria predefined in the graph induction module 408. Further, the graph induction module 408 may access the trust database 404 via the data manager 412 to confirm the predefined relationship criteria for calculating the values of attributes. For example, as shown in Equation 2, the resource-resource weighting function may be defined by attributes 'location' and 'capability'. The graph induction module 408 may access the resource profile database 416 to confirm the status of the geographical location and the hardware profiles of the resources 108 for calculating values of the respective attributes 'location' and 'capability' according to a predefined relationship criteria. For instance, the graph induction module 408 may calculate a value of the attribute 'location' as '1' if the geographical locations of the two interacting resources are same, else the value '0'. Similarly, a value of the attribute 'capability' may be calculated as value '1' by the graph induction module 408 if the hardware profiles or compute capabilities of the two interacting resources are same, else the value may be calculated as '0'.

The calculated attribute values may be used by the graph induction module 408 to calculate values of various weighting functions for determining the corresponding edge weights. Upon determining the edge weights, the graph induction module 408 creates a weighted undirected interaction graph with the received instances of the RM entities as vertices. The calculated edge weights are assigned to the edges connecting the corresponding RM entities in the graph and that the edge weights represent interaction between the RM entities. The created weighted interaction graph may be transmitted to the graph analysis module 410 via the data manager 412.

At step 706, a topology-centric analysis is performed for the weighted interaction graph. The graph analysis module 410 receives the weighted interaction graph from the graph induction module 408 via the data manager 412 upon at least one of (1) re-initialization of the trust computation device 118; (2) an explicit request generated by the graph analysis module 410 triggered by one of the RM entities via the trust interface module 406; and (3) predefined time intervals. The graph analysis module 410 performs the topology-centric analysis on the graph to capture overall connectivity of each of the vertices, referring to the RM entities, with other vertices in the graph using any of a variety of analysis techniques known in the art, related art, or developed later. In one embodiment, the graph analysis module 410 may perform implicit analysis such as spectral analysis on the received interaction graph. During the spectral analysis, each graph vertex may be mapped to the K-dimensional spectral or Laplacian embedding space created by the first K non-null Eigenvectors of the graph Laplacian matrix, where 'K' is the embedding dimension parameter, which may be predefined based on a trade-off between computational complexity and intended coverage of the vertices nearest to the reference vertex in the Laplacian space. Greater the value of 'K' more comprehensive is the coverage, but greater is the computational complexity. The value of 'K' is smaller than the total number 'N' of vertices in the interaction graph, and in some embodiments, may be dynamically received from at least one of the RM entities via the trust interface module 406.

At step 708, Euclidean distances are computed for each pair of the graph vertices based on the performed analysis. For each reference vertex indicated by a trust query, the graph analysis module 410 may compute the Euclidean distances from the reference vertex to other vertices mapped in the K-dimensional spectral embedding space. The Euclidean distances in the K-dimensional spectral embedding space are proportional to compute time distances (CTDs), which represent the average connectivity of the vertices over the weighted graph topology. The CTDs, and hence the Euclidean distances, are inversely related to (1) the number of edges and (2) lengths of edges, i.e., edge weights, connecting any two vertices. This inverse relationship represents that any pair graph vertices are strongly connected if multiple connecting paths (sequence of vertices and edges) exist between the pair of vertices, thereby capturing the connectivity structure of the graph volume rather than a single path between the two vertices. The graph analysis module 410 may also interact with the data manager 412 to log each received trust query from at least one of the RM entities and associated output, for example, the trust ranking of the entities represented as the graph vertices.

At step 710, the trust index for at least one of the RM entities with respect to other entities is determined based on the computed Euclidean distances. In one embodiment, the Euclidean distances between any pair of graph vertices provide a measure of trust between the corresponding RM entities due to the Euclidean distances being inversely related to the number and the length of edges connecting these RM entities. Lesser the Euclidean distance (i.e., greater the number of edges and the edge weight) between the pair of graph vertices, greater is the average connectivity and hence, greater is the trust, between the corresponding entities. Based on the determined trust, the graph analysis module 410 may create a trust index for at least one of the RM entities. The trust index may include the RM entities being ranked with respect to a reference entity, such as one of the users 102, one of the resources 108, etc., based on their Euclidean distances from the reference entity, where the smallest Euclidean distance represents the highest trust ranking of a particular RM entity with respect to the reference entity. In some embodiments, the graph analysis module 410 may sort the Euclidean distances or trust ranking of the RM entities in the created trust index. In the similar manner, the graph analysis module 410 may compute trust indices for all the RM entities represented as vertices in the interaction graph.

In another embodiment, the trust computation device 118 may determine various communities of the ranked RM entities in the created trust indices based on one or more of their attributes. In one example, the graph analysis module 410 may determine communities of the RM entities ranked in different trust indices based on the historical resource usage, and geographical location. For this, the graph analysis module 410 may receive the interaction graph, the embedding dimension parameter X', and a predetermined number of communities 'M' expected to be associated with the resource marketplace 110. For each RM entity, the graph analysis module 410 may determine its community affiliation by computing a K-dimensional spectral embedding of the interaction graph, and employing K-means spectral clustering in the embedding space with 'M' as the input parameter. In some embodiments, the expected number of communities M may be heuristically predefined and may be equal to the dimension of the spectral embedding, i.e., K. Such spectral clustering algorithm may be employed for determining the community structure among the RM entities, which are associated with the resource marketplace 110 and represented in the received interaction graph. However, various other methods known in the art, related art, or developed later may be employed for determining communities of the RM entities.

The trust computation performed by the trust computation device 118 is scalable since (1) Eigen vectors of the graph Laplacian matrix may be efficiently determined due to the inherent sparseness of the interaction graph in the K-dimensional spectral embedding space, where K is relatively smaller than N, which refers to the original embedding dimension parameter corresponding to the total number of vertices in the interaction graph; and (2) once the Eigen vectors are computed in the K-dimensional spectral embedding space, the trust ranking between the RM entities may be efficiently computed, for example, by sorting the Euclidean distances in the K-dimensional spectral embedding space.

Further, the above discussed trust computation is robust since the average connectivity between any pair of graph vertices over the graph topology is considered as opposed to individual paths or edges in the (local) neighborhood of a reference vertex in the existing art. Such topology-centric analysis that considers overall interaction between the pair of RM entities for trust computation prevents any unauthentic data (e.g., artificial or fake inflation of edge weights for few edges) to corrupt or negatively influence determination of the trust index.

Figure 8:
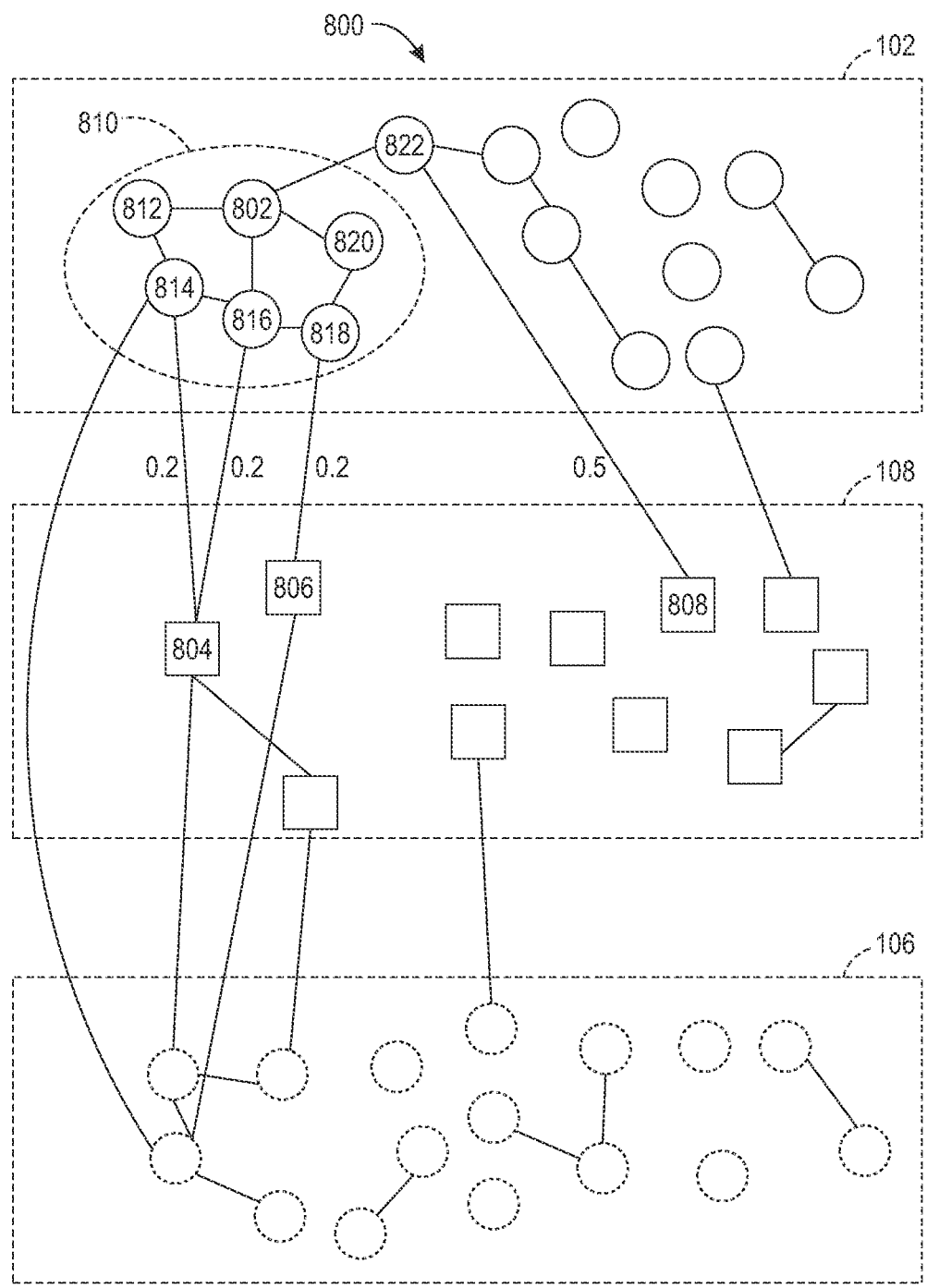
FIG. 8 is a schematic that illustrates an exemplary interaction graph for computing trust using the trust computation device of FIG. 1, according to an embodiment of the present disclosure.

FIG. 8 is a schematic that illustrates an exemplary interaction graph 800 for computing trust using the trust computation device of FIG. 1, according to an embodiment of the present disclosure. Similar to the interaction graph 500, the interaction graph 800 is an undirected graph including solid circular vertices such as 802, 812, 814, 816, 818, 820, 822, . . . , so on, that represent the users 102, and square vertices such as 804, 806, 808, . . . , so on, representing the resources 108. In one embodiment, the vertex 802 may be the reference vertex connected to vertices 804, 806, and 808 with edges having positively-weighted edge weights. The reference vertex 802 may be connected to the vertex 804 via a community 810 having multiple vertices 812, 814, 816, 818 and 820, in which the vertices 814 and 816 are connected to the vertex 804 with edges having edge weights 0.2 and 0.2, respectively. The reference vertex 802 is connected to the vertex 806 via the same community 810 in which the vertex 818 is connected to the vertex 806 with an edge having an edge weight 0.2. The reference vertex 802 is connected to the vertex 808 via the vertex 822, which is outside the community 810. The vertex 822 is connected to the vertex 808 with an edge having an edge weight 0.5.

In one embodiment, for computing trust ranking of the vertices 804, 806, and 808 with respect to the reference vertex 802, the trust computation device 118 may consider the Euclidean distances, i.e., the average connectivity, between the reference vertex 802 and its nearby vertices 804, 806, and 808. The average connectivity is inversely related to (1) the number of edges and (2) the lengths of edges, i.e., edge weights, connecting the reference vertex 802 with the nearby vertices 804, 806, and 808. Also, the average connectivity is directly related to affiliation of the nearby vertices, such as the vertices 804, 806, and 808, to one or more communities to which the reference vertex 802 is associated. Hence, the trust level between a reference vertex, such as the reference vertex 802 and other graph vertices, such as the vertices 804, 806, 808, representing the RM entities is transitive in nature based on affiliation of the RM entities to one or more communities associated with the reference vertex.

In the shown example, among the vertices 804, 806, and 808, the vertex 804 has the highest trust ranking since (1) it is connected to the reference vertex 802 via multiple edges connected to the vertices 814 and 816; and (2) the vertices 814 and 816 are affiliated to the community 810 that is associated with the reference vertex 802. The vertex 806 has the second highest trust ranking since it is connected to the reference vertex 802 via the vertex 818, which is affiliated to the community 810 associated with the reference vertex 802. The vertex 808 has the lowest trust ranking among the vertices 804, 806, and 808, even though the edge weight of the edge connecting the vertex 808 to the vertex 822 is the highest. This is because the vertex 808 is connected to the reference vertex 802 by a single path or edge via the vertex 822, which has no affiliation to the community 810 associated with the reference vertex 802.

Exemplary embodiments are intended to cover all software or computer programs capable of performing the various heretofore-disclosed determinations, calculations, etc., for the disclosed purposes. For example, exemplary embodiments are intended to cover all software or computer programs capable of enabling processors to implement the disclosed processes. In other words, exemplary embodiments are intended to cover all systems and processes that configure a document operating system to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

In accordance with the exemplary embodiments, the disclosed computer programs may be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs may be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

What is claimed is:

1. A method for computing trust index among a plurality of entities associated with a resource marketplace, the method comprising:
   receiving a plurality of inputs including interaction attributes, attribute importance factors, references to databases, and a plurality of entities associated with the resource marketplace, wherein the entities comprise at least users, resources, and resource owners;
   creating a weighted-interaction graph based on the received plurality of inputs, wherein the weighted-interaction graph includes a plurality of vertices representing the plurality of entities;
   performing a topology-specific analysis of the weighted-interaction graph;
   computing Euclidean distances for each pair of vertices among the plurality of vertices in the weighted-interaction graph based on the performed analysis; and
   determining a trust index for a first entity in the received plurality of entities based on the computed Euclidean distances, the trust index includes ranking of at least one of the plurality of entities with respect to the first entity, the ranking being inversely proportional to the computed Euclidean distances, wherein
   the first entity comprises a user and the trust index is used to determine one or more marketplace entities comprising resources for performing the user's task, or
   the first entity comprises a resource owner and the trust index is used to determine one or more marketplace entities comprising resources for performing a task received by the resource owner from a marketplace entity comprising a user.

2. The method of claim 1, further comprising determining at least one community of entities within the plurality of entities based on at least one of the interaction attributes and the determined trust index.

3. The method of claim 2, wherein the trust index for the first entity is determined based on a combination of the computed Euclidean distances and the determined at least one community of entities to which the first entity is associated.

4. The method of claim 1, wherein the interaction attributes include at least one of social network connectivity, geographical location, organizational affiliation, hardware profile, usage frequency, and user feedback for the plurality of entities.

5. The method of claim 1, wherein the databases store at least one of user profiles, social network connectivity profiles, historical usage profiles, resource profiles, and resource owner profiles for the plurality of entities.

6. The method of claim 1, wherein performing the topology-specific analysis includes embedding the weighted-interaction graph in a spectral space of a dimension being predefined or received from at least one of the plurality of entities.

7. The method of claim 6, wherein the dimension is smaller than the total number of vertices in the weighted-interaction graph.

8. The method of claim 1, wherein the weighted-interaction graph is undirected in nature.

9. The method of claim 1, wherein interactions within the plurality of entities are weighted using predetermined weighting functions.

10. The method of claim 9, wherein at least one of the weighting functions is a linear combination of one or more of the interaction attributes and the attribute importance factors.

11. The method of claim 9, wherein a sum of the attribute importance factors associated with each of the predetermined weighting functions is one.

12. The method of claim 9, wherein values of the weighting functions are normalized to range from zero to one.

13. The method of claim 9, wherein values of the weighting functions are computed periodically or upon request.

14. The method of claim 1, wherein values of the interaction attributes are computed according to predetermined relationship criteria for the plurality of entities.

15. The method of claim 1, wherein at least one of the steps of creating, performing, computing, and determining is embodied in software that is configured for implementation by a processor.

16. The method of claim 15, wherein the step of receiving a plurality of inputs includes receiving inputs that are configured for use with an input/output device, such that the input/output device is configured to:
   receive the inputs relating to the interaction attributes, the attribute importance factors, the references to the databases, and the plurality of entities associated with the resource marketplace; and
   output corresponding data to the processor.

17. The method of claim 1, wherein the step of receiving the plurality of inputs includes receiving the inputs via a network.

18. A device for computing trust index for at least one entity interacting with a plurality of entities associated with a resource marketplace, the device comprising:
a memory;
a database including profiles and historical usage information for the plurality of entities, wherein the device is further configured to:
receive a plurality of inputs including at least one of the plurality of entities, interaction attributes, attribute importance factors for each of the interaction attributes, and a reference to the database; and
create a weighted-interaction graph based on the plurality of inputs, the integration graph includes vertices representing the at least one entity and the plurality of entities, wherein the entities comprise at least users, resources, and resource owners;
perform a topology-specific analysis of the weighted-interaction graph;
compute Euclidean distances for each pair of vertices in the weighted-interaction graph based on the performed topology-specific analysis; and
determine a trust index for the at least one entity based on the computed Euclidean distances, the trust index includes ranking of at least one of the plurality of entities with respect to the at least one entity, the ranking being inversely proportional to the computed Euclidean distances, wherein
the first entity comprises a user and the trust index is used to determine one or more marketplace entities comprising resources for performing the user's task, or
the first entity comprises a resource owner and the trust index is used to determine one or more marketplace entities comprising resources for performing a task received by the resource owner from a marketplace entity comprising a user.

19. A non-transitory computer-readable medium comprising computer-executable instructions for computing trust index among a plurality of entities associated with a resource marketplace, the non-transitory computer-readable medium comprising instructions for:
receiving a plurality of inputs including interaction attributes, attribute importance factors, instances of accessible databases, and a plurality of entities associated with the resource marketplace;
creating a weighted-interaction graph based on the received plurality of inputs, wherein the weighted-interaction graph includes vertices being represented by the plurality of entities, wherein the entities comprise at least users, resources, and resource owners;
performing a topology-specific analysis of the weighted-interaction graph;
computing Euclidean distances for each pair of vertices in the weighted-interaction graph based on the performed analysis; and
determining a trust index for a first entity in the received plurality of entities based on the computed Euclidean distances, the trust index includes ranking of at least one of the plurality of entities with respect to the first entity, the ranking being inversely proportional to the computed Euclidean distances, wherein
the first entity comprises a user and the trust index is used to determine one or more marketplace entities comprising resources for performing the user's task, or
the first entity comprises a resource owner and the trust index is used to determine one or more marketplace entities comprising resources for performing a task received by the resource owner from a marketplace entity comprising a user.

20. The method of claim 2, wherein the determined community of entities comprises at least users and resource owners, and the community of entities is determined based on embedding the weighted-interaction graph in a K-dimensional spectral space and performing K-means clustering on the K-dimensional spectral space.

* * * * *